United States Patent
Yoshioka et al.

(10) Patent No.: US 11,552,752 B2
(45) Date of Patent: Jan. 10, 2023

(54) USER TERMINAL AND RADIO COMMUNICATION METHOD

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/647,430

(22) PCT Filed: Sep. 15, 2017

(86) PCT No.: PCT/JP2017/033592
§ 371 (c)(1),
(2) Date: Mar. 13, 2020

(87) PCT Pub. No.: WO2019/053902
PCT Pub. Date: Mar. 21, 2019

(65) Prior Publication Data
US 2020/0274661 A1    Aug. 27, 2020

(51) Int. Cl.
*H04L 5/00* (2006.01)
*H04L 5/02* (2006.01)
*H04W 72/12* (2009.01)
*H04L 1/00* (2006.01)

(52) U.S. Cl.
CPC .......... *H04L 5/0012* (2013.01); *H04L 1/0013* (2013.01); *H04L 5/0042* (2013.01); *H04L 5/023* (2013.01); *H04W 72/1268* (2013.01); *H04W 72/1284* (2013.01)

(58) Field of Classification Search
None
See application file for complete search history.

(56) References Cited

U.S. PATENT DOCUMENTS

| | | | |
|---|---|---|---|
| 2014/0376468 A1* | 12/2014 | He | H04L 5/0055 370/329 |
| 2017/0041923 A1* | 2/2017 | Park | H04L 1/1671 |
| 2017/0215179 A1* | 7/2017 | Choi | H04L 1/0025 |
| 2017/0289108 A1* | 10/2017 | Lee | H04K 3/25 |
| 2018/0343148 A1* | 11/2018 | Hosseini | H04W 52/146 |
| 2019/0045498 A1* | 2/2019 | Huang | H04W 72/085 |
| 2019/0081744 A1* | 3/2019 | Yang | H04W 72/1205 |

(Continued)

FOREIGN PATENT DOCUMENTS

WO    2017019132 A1    2/2017

OTHER PUBLICATIONS

International Search Report issued in PCT/JP2017/033592 dated Dec. 5, 2017 (2 pages).

(Continued)

*Primary Examiner* — Phirin Sam
(74) *Attorney, Agent, or Firm* — Osha Bergman Watanabe & Burton LLP

(57) ABSTRACT

A terminal is disclosed including a transmitter that transmits uplink control information and uplink data using an uplink shared channel; and a processor that, if frequency hopping is applied to the uplink shared channel, determines a mapping position for the uplink control information for each hop of the frequency hopping. In other aspects, a radio communication method for a terminal is also disclosed.

6 Claims, 15 Drawing Sheets

(56) References Cited

U.S. PATENT DOCUMENTS

| | | | |
|---|---|---|---|
| 2019/0098622 A1* | 3/2019 | Lee | H04W 52/367 |
| 2019/0199477 A1* | 6/2019 | Park | H04L 1/0026 |
| 2019/0223201 A1* | 7/2019 | Lee | H04W 72/0413 |
| 2020/0044781 A1* | 2/2020 | Rudolf | H04L 1/1678 |
| 2020/0052835 A1* | 2/2020 | Xiong | H04B 7/0632 |
| 2020/0274660 A1* | 8/2020 | Xiong | H04L 5/0012 |
| 2021/0068102 A1* | 3/2021 | Marinier | H04W 52/146 |
| 2021/0176745 A1* | 6/2021 | Bendlin | H04B 1/7143 |
| 2021/0385852 A1* | 12/2021 | Papasakellariou | H04L 1/0072 |

OTHER PUBLICATIONS

Written Opinion of the International Searching Authority issued in PCT/JP2017/033592 dated Dec. 5, 2017 (3 pages).

LG Electronics; "Support of UCI piggyback on PUSCH for NR"; 3GPP TSG RAN WG1 Meeting #90, R1-1713182; Prague, Czech Republic; Aug. 21-25, 2017 (6 pages).

MediaTek Inc.; "Discussion on UCI on PUSCH"; 3GPP TSG RAN WG1 Meeting #90, R1-1713702; Prague, R.R. Czechia; Aug. 21-25, 2017 (3 pages).

NTT Docomo, Inc.; "UCI on PUSCH"; 3GPP TSG RAN WG1 Meeting #90, R1-1713945; Prague, Czechia; Aug. 21-25, 2017 (8 pages).

InterDigital Inc.; "Considerations on UCI transmission on PUSCH"; 3GPP TSG RAN WG1 Meeting #90, R1-1714158; Prague, Czech Republic; Aug. 21-25, 2017 (4 pages).

Ericsson; "On UCI Transmission on PUSCH"; 3GPP TSG RAN WG1 Meeting #90, R1-1714427; Prague, Czech Republic; Aug. 21-25, 2017 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG RAN WG1 Meeting NR-AH#3; R1-1716120 "Channel structure and frequency-hopping details of long-PUCCH for UCI of up to 2 bits" Panasonic; Nagoya, Japan; Sep. 18-21, 2017 (4 pages).

3GPP TSG RAN WG1 Meeting NR#3; R1-1715879 "Design of long PUCCH for UCI of up to 2 bits for NR" LG Electronics; Nagoya, Japan; Sep. 18-21, 2017 (6 pages).

3GPP TSG RAN WG1 NR Ad-Hoc#3; R1-1716102 "UCI multiplexing" NTT Docomo, Inc.; Nagoya, Japan; Sep. 18-21, 2017 (5 pages).

Extended European Search Report issued in European Application No. 17924978.4, dated Mar. 10, 2021 (10 pages).

Office Action issued in Japanese Application No. 2019-541615; dated Nov. 30, 2021 (8 pages).

Office Action issued Indian Application No. 202037016535 dated Mar. 29, 2022 (7 pages).

* cited by examiner

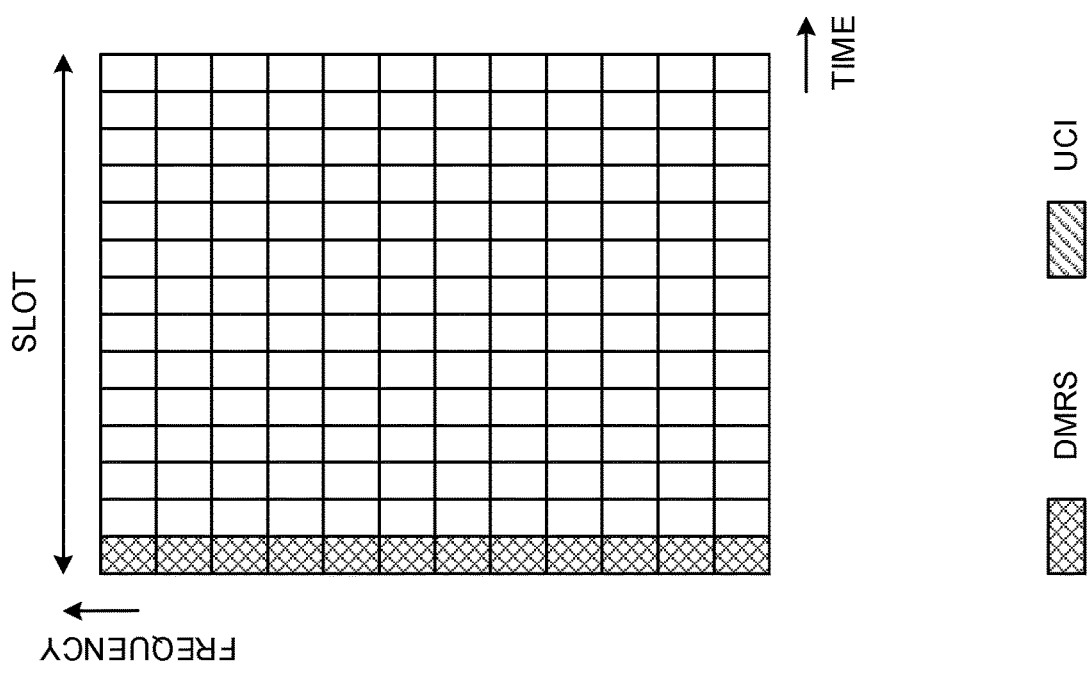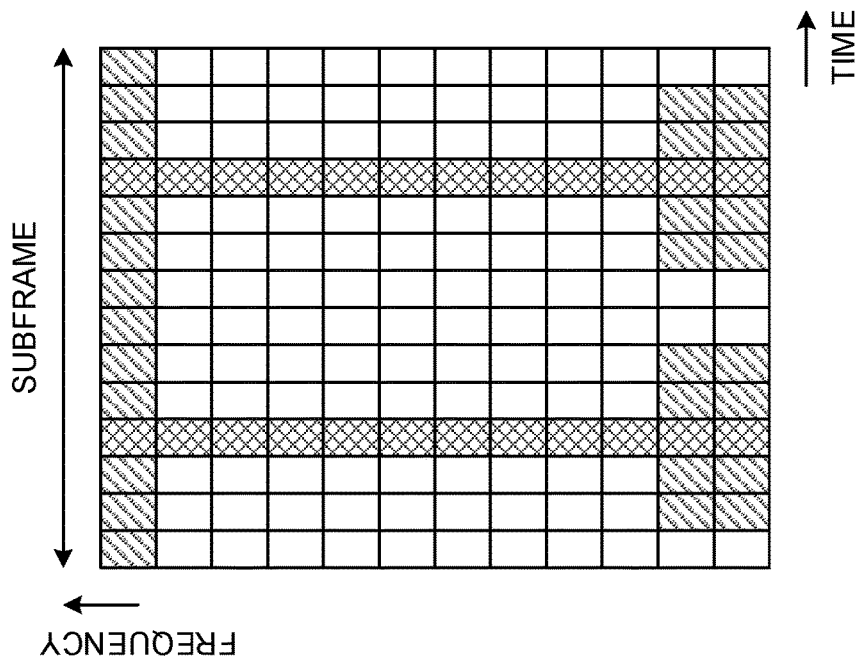

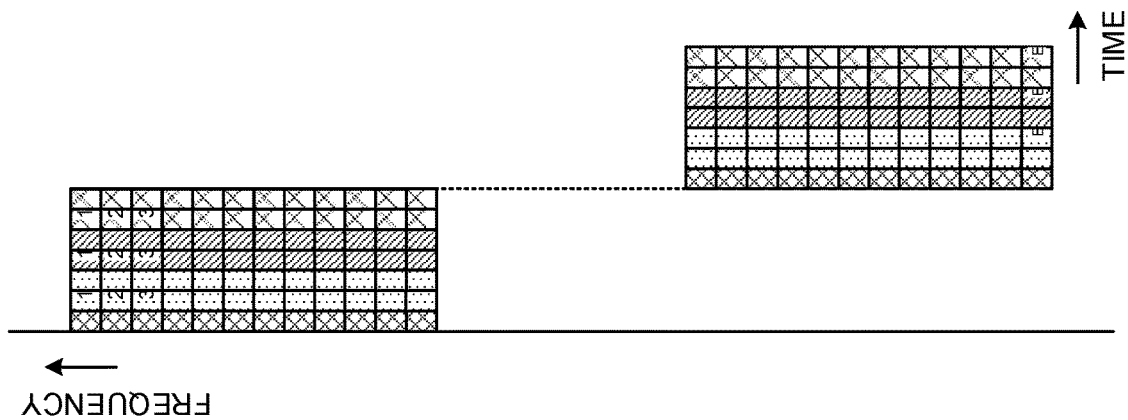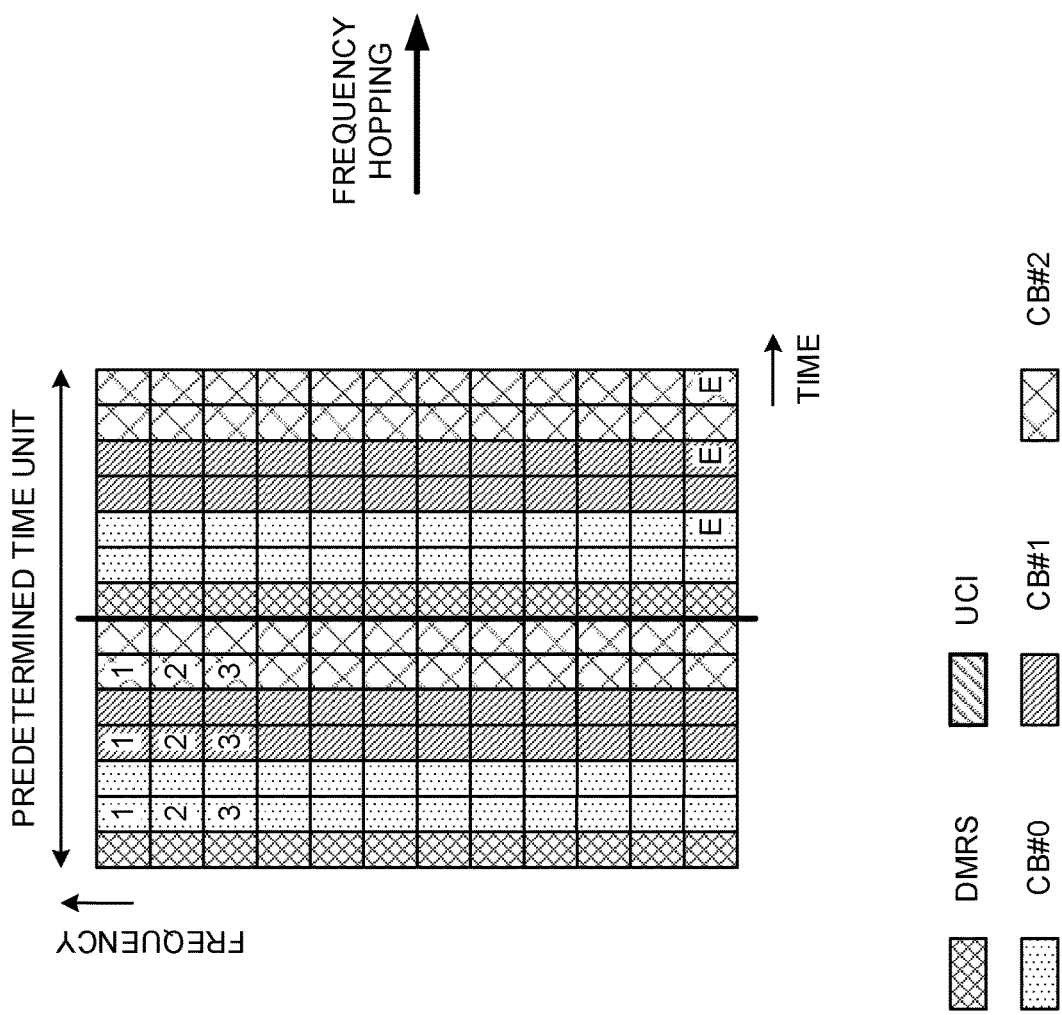
FIG. 3

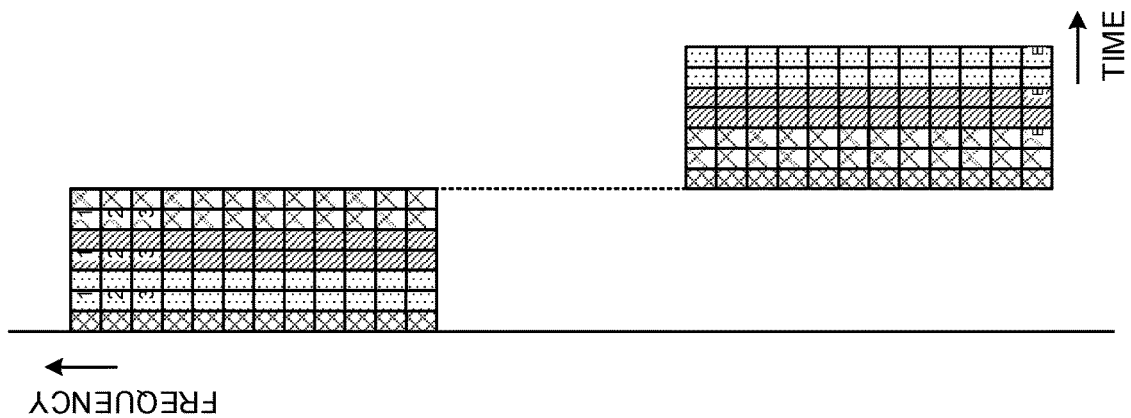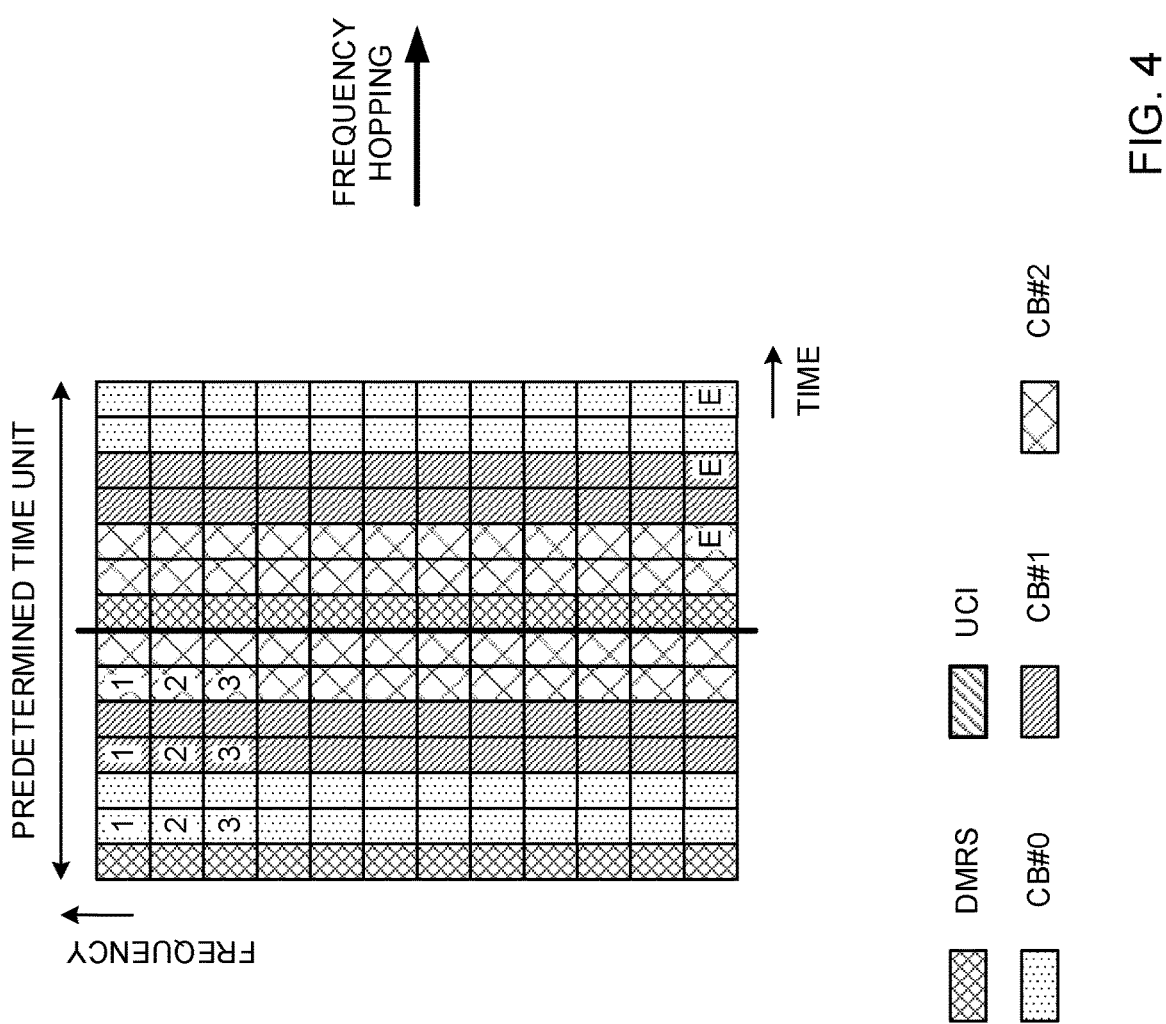
FIG. 4

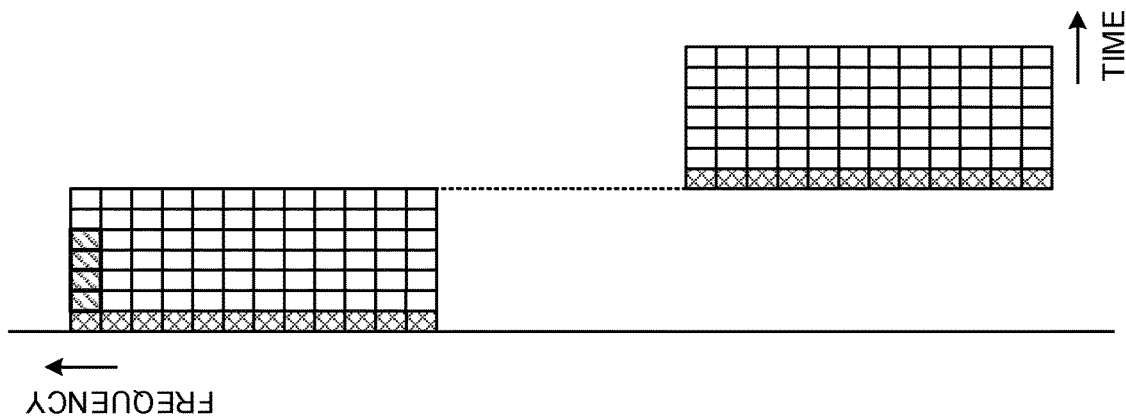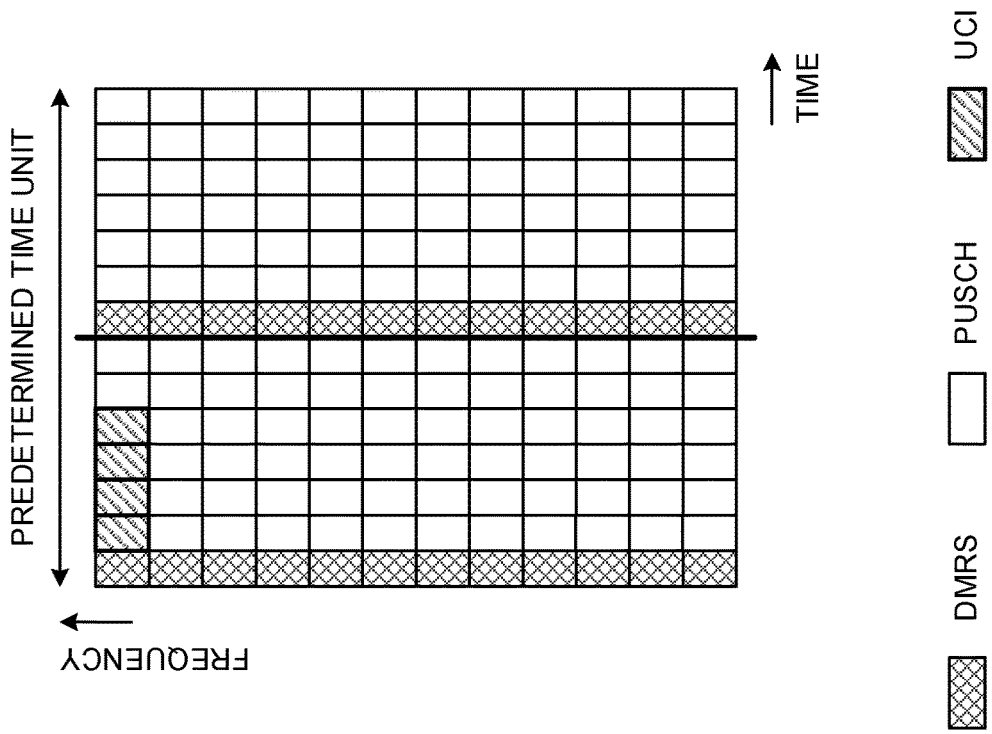
FIG. 5

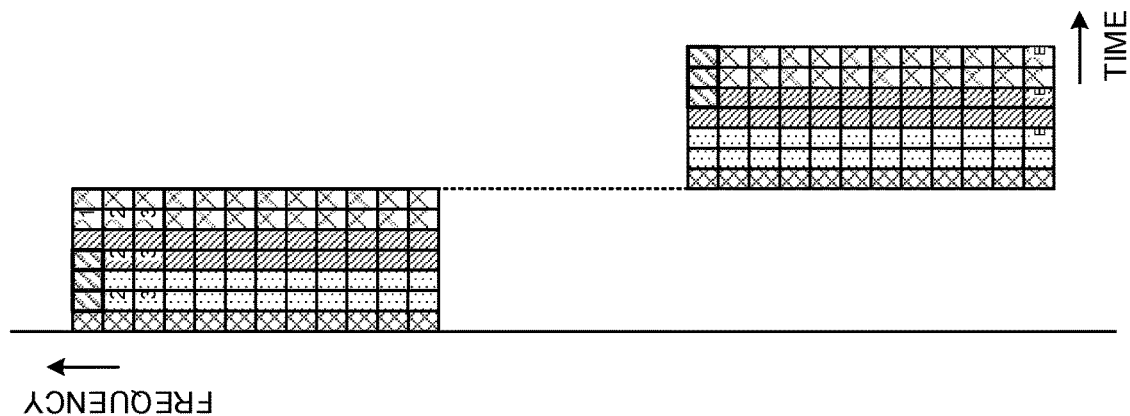
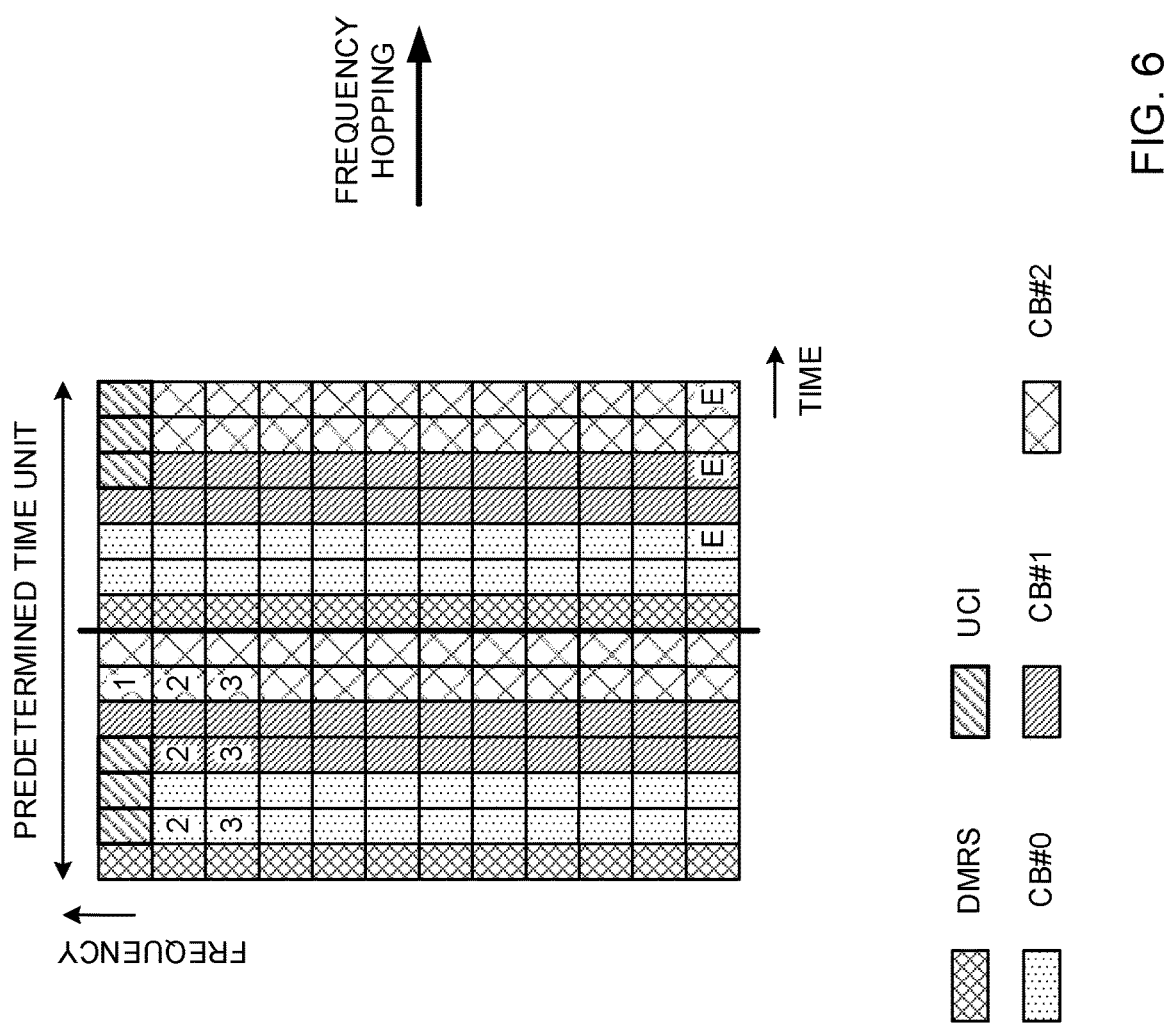
FIG. 6

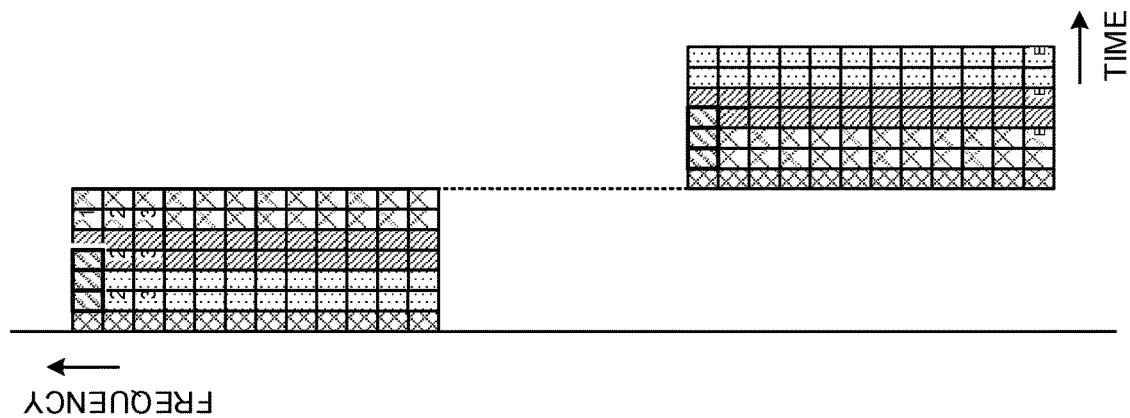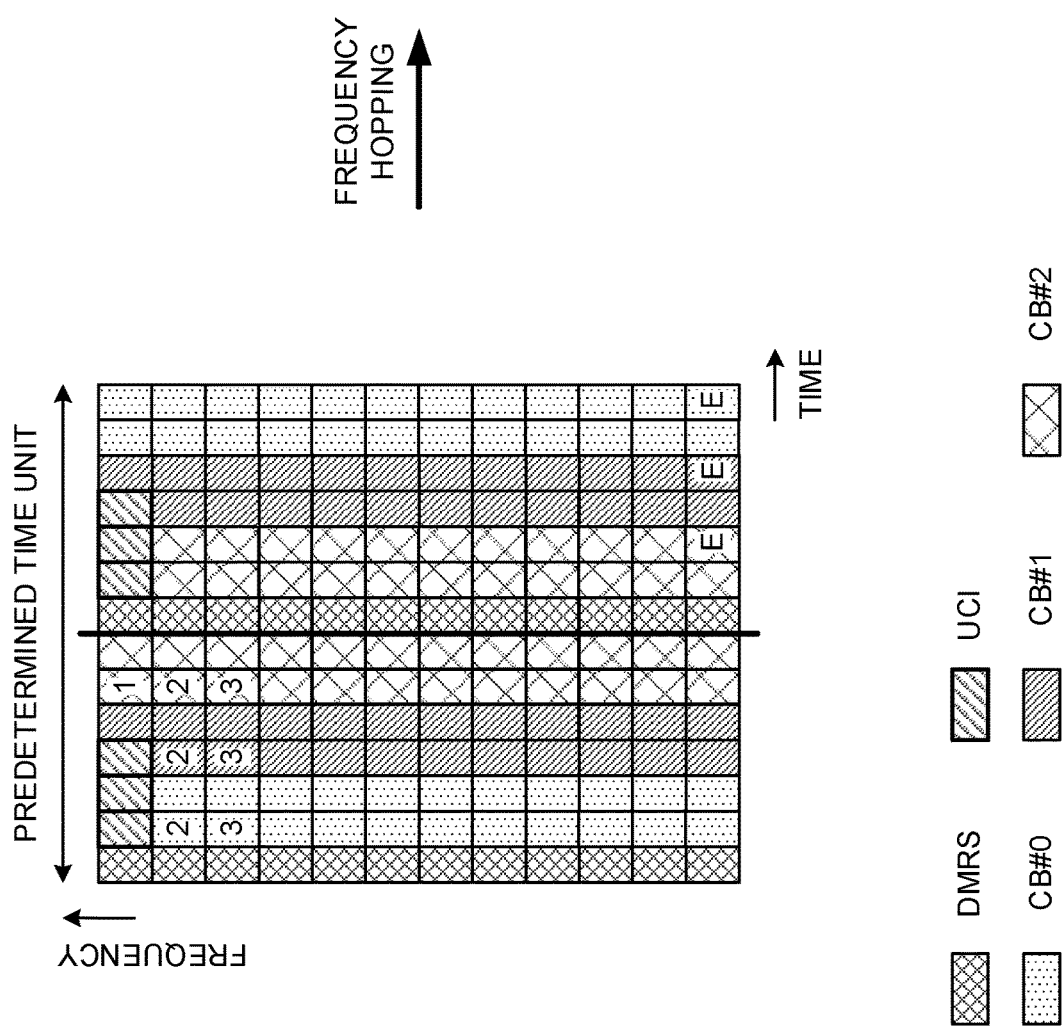
FIG. 7

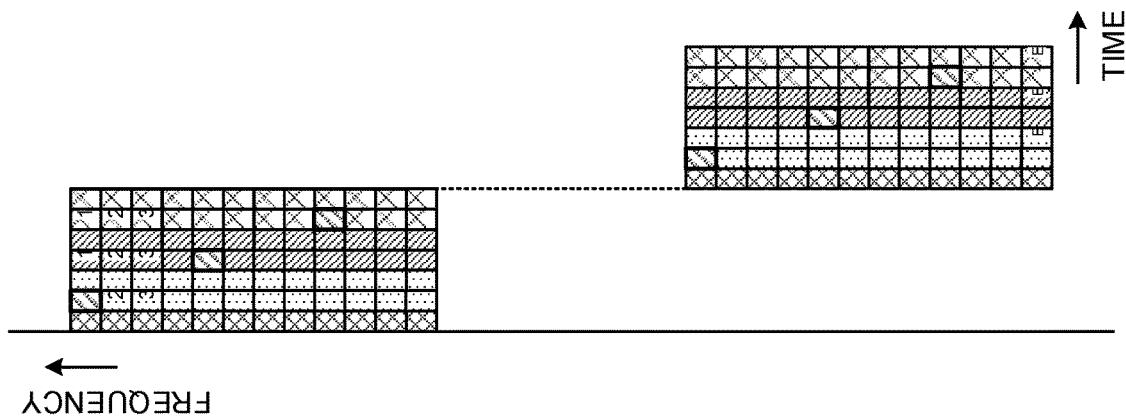
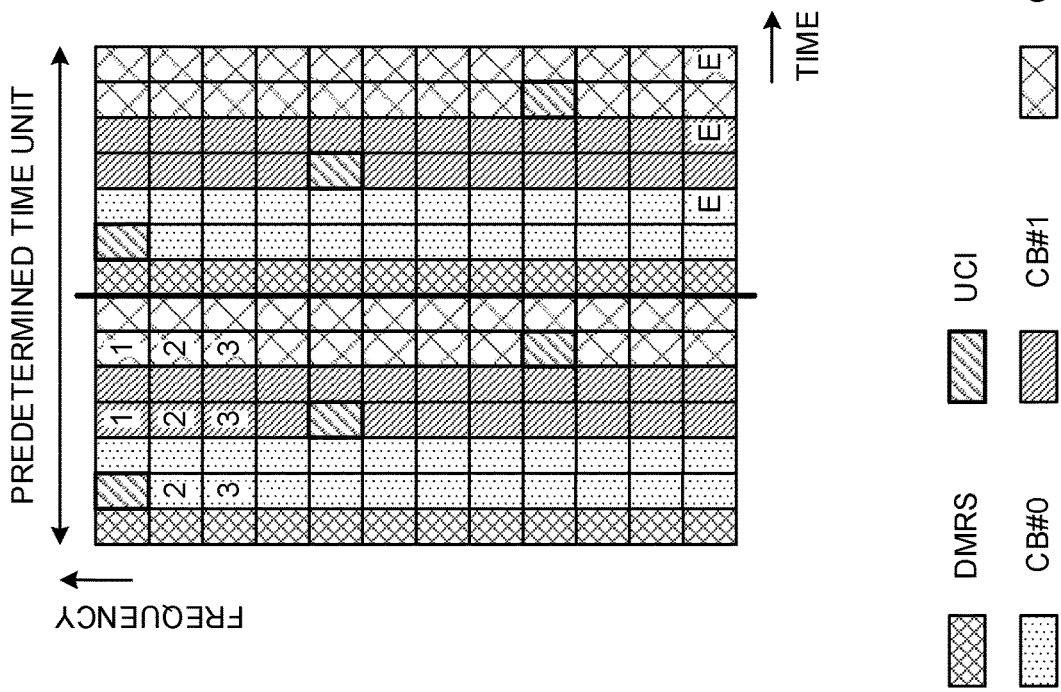
FIG. 8

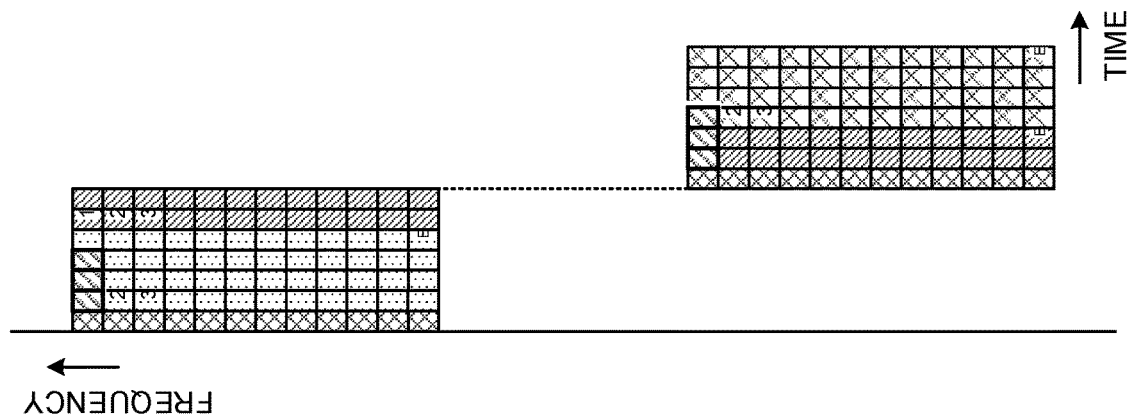
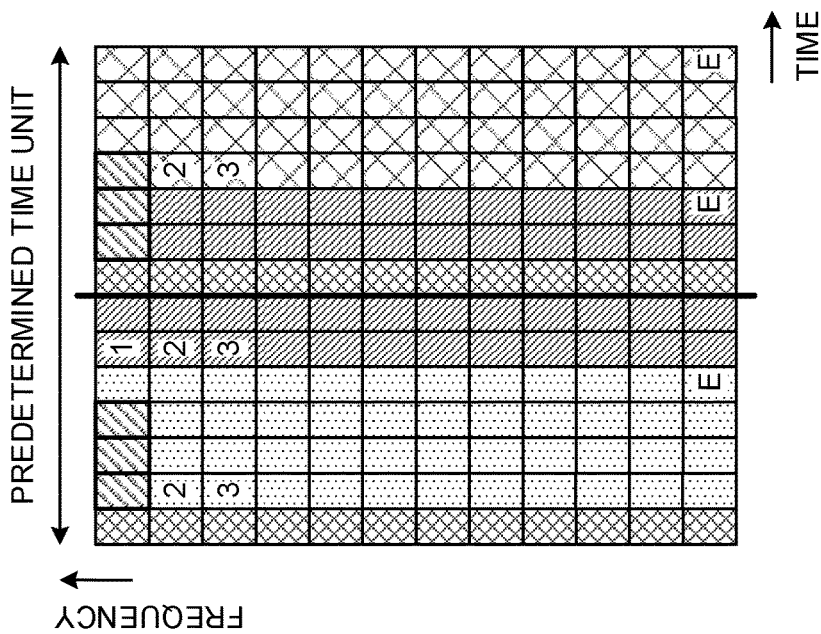
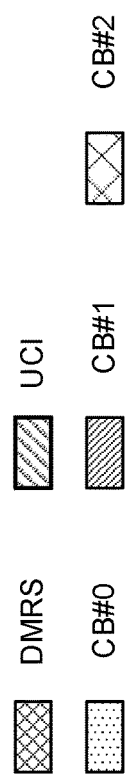
FIG. 9

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

The uplink (UL) in existing LTE systems (for example, LTE Rel. 8 to 13) supports the DFT-spread OFDM (DFT-s-OFDM (Discrete Fourier Transform-Spread-Orthogonal Frequency Division Multiplexing)) waveform. The DFT-spread OFDM waveform is a single-carrier waveform, so that it is possible to prevent the peak-to-average power ratio ((PAPR) from increasing.

Also, in existing LTE systems (for example, LTE Rel. 8 to 13), a user terminal transmits uplink control information (UCI) by using a UL data channel (for example, PUSCH (Physical Uplink Control CHannel)) and/or a UL control channel (for example, PUCCH (Physical Uplink Control CHannel)).

This UCI's transmission is controlled based on whether or not simultaneous transmission of PUSCH and PUCCH ("simultaneous PUSCH and PUCCH transmission") is configured, and whether or not PUSCH is scheduled within the TTI where the UCI is transmitted. Transmitting UCI by using PUSCH is also referred to as "UCI on PUSCH."

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

In existing LTE systems, when the timing to transmit uplink data (for example, UL-SCH) and the timing to transmit uplink control information (UCI) overlap, the uplink data and the UCI are transmitted using an uplink shared channel (PUSCH) (UCI on PUSCH). Also, in future radio communication systems, uplink data and UCI (A/Ns and the like) may be transmitted using PUSCH, as in existing LTE systems.

Also, envisaging future radio communication systems, an agreement has been reached to allocate demodulation reference signals to different locations than existing LTE systems, in UL transmission. In addition, studies are in progress to apply frequency hopping to uplink shared channels, and transmit uplink data by using a number of uplink shared channels. In this way, when different configurations than existing LTE systems are employed, the problem lies in how to control the transmission of uplink control information using an uplink shared channel.

The present invention has been made in view of the above, and it is therefore an object of the present invention to provide a user terminal and a radio communication method that allow proper communication even when uplink data and uplink control information are transmitted using an uplink shared channel, in future radio communication systems.

Solution to Problem

In accordance with one aspect of the present invention, a user terminal has a transmission section that transmits uplink data, in units of predetermined blocks, by using an uplink shared channel that is configured in a plurality of domains that are different in frequency and/or time, and a control section that controls so that, when uplink control information is transmitted using the uplink shared channel, the uplink control information is multiplexed in each of the plurality of domains.

Advantageous Effects of Invention

According to the present invention, it is possible to communicate properly even when uplink data and uplink control information are transmitted using an uplink shared channel, in future radio communication systems.

BRIEF DESCRIPTION OF DRAWINGS

FIG. 1A is a diagram to show an example of how DMRS for PUSCH is allocated in existing LTE systems, and FIG. 1B is a diagram to show an example of how DMRS is allocated in future radio communication systems;

FIG. 3 is a diagram to show an example of applying frequency hopping to PUSCH;

FIG. 4 is a diagram to show another example of applying frequency hopping to PUSCH;

FIG. 5 is a diagram to show an example of the method for multiplexing UCI when applying frequency hopping to PUSCH;

FIG. 6 is a diagram to show an example of the method for multiplexing UCI according to the present embodiment when applying frequency hopping to PUSCH;

FIG. 7 is a diagram to show another example of the method for multiplexing UCI according to the present embodiment when applying frequency hopping to PUSCH;

FIG. 8 is a diagram to show another example of the method for multiplexing UCI according to the present embodiment when applying frequency hopping to PUSCH;

FIG. 9 is a diagram to show another example of the method for multiplexing UCI according to the present embodiment when applying frequency hopping to PUSCH;

DESCRIPTION OF EMBODIMENTS

In UL communication in existing LTE systems, assuming that transmission of UCI and transmission of uplink data (UL-SCH) might take place at a same timing, the method of multiplexing and transmitting UCI and uplink data on PUSCH (also referred to as "UCI piggyback on PUSCH," "UCI on PUSCH" and/or the like) is supported. By using UCI on PUSCH, low PAPRs (Peak-to-Average Power Ratios) and/or low inter-modulation distortion (IMD) in UL communication can be achieved.

Research is also underway on supporting UCI on PUSCH in UL communication in future radio communication systems (for example, LTE Rel. 14 or later versions, 5G, NR, etc.).

Moreover, in existing LTE systems, the demodulation reference signal (also referred to as "DMRS") for PUSCH is allocated in 2 symbols (for example, the fourth symbol and the eleventh symbol) in a subframe (see FIG. 1A). By contrast with this, as for future radio communication systems, an agreement has been reached on placing the DMRS for PUSCH at the head of a subframe (or a slot) in UL communication (see FIG. 1B). In this way, PUSCH configurations that are different from those of existing LTE systems will be adopted in future radio communication systems, so that it is desirable to apply UCI on PUSCH, which is suitable for such PUSCH configurations.

Figure 2:
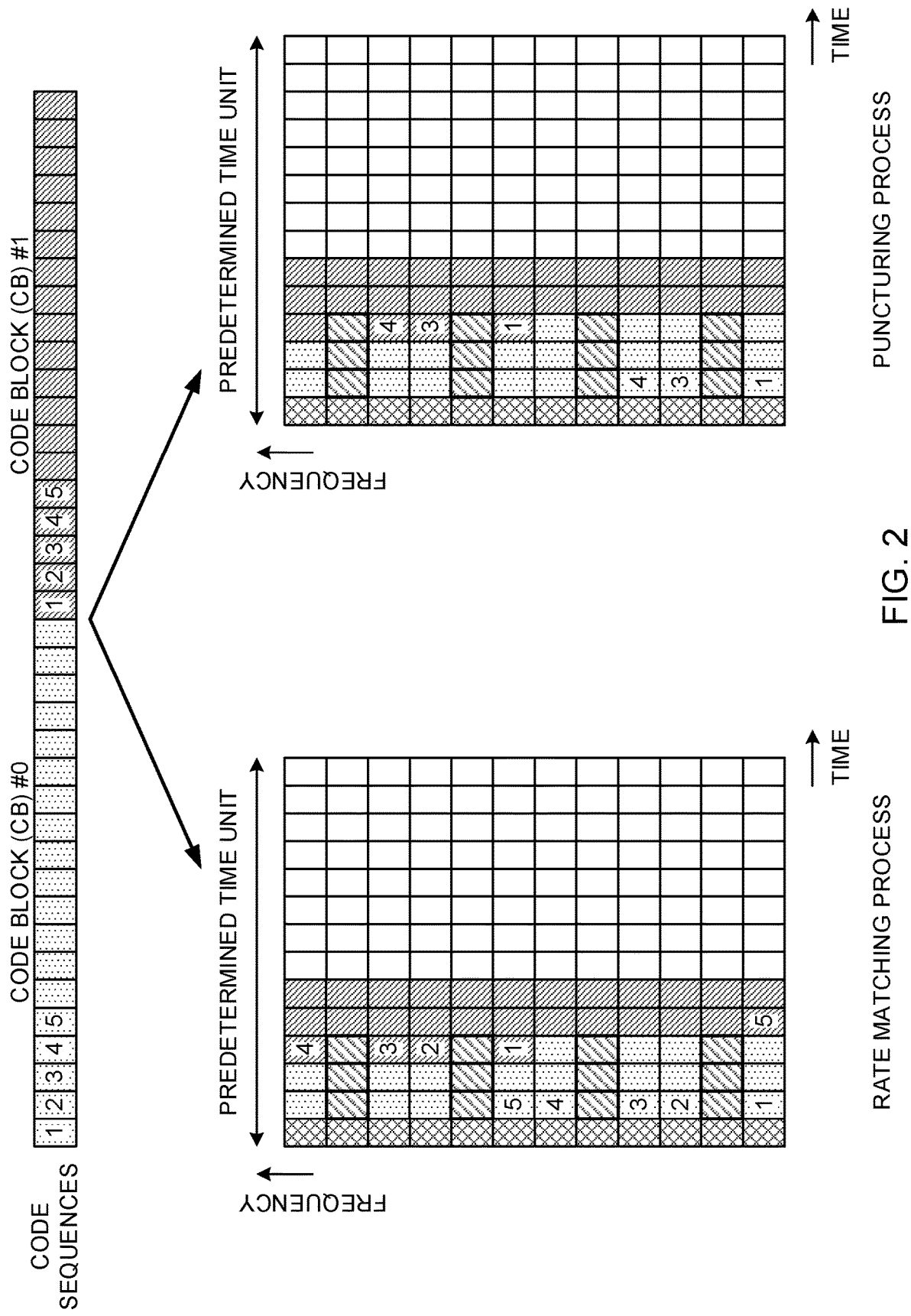
FIG. 2 is a diagram to explain a case where a rate matching process and a puncturing process are introduced in a method of mapping UCI.

It may be possible to introduce a rate matching process and/or a puncturing process in the method of multiplexing uplink control information (UCI) on PUSCH. FIG. 2 shows a case where UCI is multiplexed by applying a rate matching process or a puncturing process to uplink data that is transmitted in multiple code blocks (here, in CB #0 and CB #1).

FIG. 2 shows the method for multiplexing UCI for use when uplink data is transmitted on PUSCH on a per code block (CB) basis. CBs are units that are formed by dividing a transport block (TB).

In existing LTE systems, when the size of a transport block (TBS (Transport Block Size)) exceeds a predetermined threshold (for example, 6144 bits), the TB is divided into one or more segments (code blocks (CBs)) and encoded in segment units (code block segmentation). Each encoded code block is concatenated and transmitted. TBS is the size of a transport block, which is the unit of information bit sequences. One or more TBs are assigned to 1 subframe.

The rate matching process refers to controlling the number of encoded bits by taking into account the radio resources that are actually available for use. That is, the coding rate of UL data is changed and controlled depending on the number of UCIs multiplexed (see FIG. 2). To be more specific, as shown in FIG. 2, control is exerted so that CB sequences (1 to 5) are not allocated to positions where UCI is multiplexed. By this means, while code sequences of uplink data can be multiplexed without damage, it is still not possible to receive data properly unless radio base stations and user terminals share in common the positions where UCI is multiplexed.

Also, in the puncturing process, encoding is executed on the assumption that resources that are allocated for data are all available for use and encoded symbols are not mapped to resources (free resources) that are not actually available for use (for example, UCI resources). That is, UL data code sequences that are mapped are overwritten by UCI (see FIG. 2). To be more specific, CB sequences (1 to 5) are allocated even in positions where UCI is multiplexed, as shown in FIG. 2, and UCI-multiplexed sequences (2 and 5) are overwritten by UCI. This does not alter the positions of other code sequences, so that, even when inconsistencies arise between radio base stations and UEs with regards to the multiplexing of UCI, data can be received properly, and more easily.

It is anticipated that, in future radio communication systems, too, at least the puncturing process will be used in UCI on PUSCH. However, the problem with applying the puncturing process is that, the error rate of uplink data is degraded as the number of resources (the number of symbols and/or the number of resource elements) to be punctured increases.

Also, envisaging future radio communication systems, research is underway to transmit uplink data by configuring an uplink shared channel (PUSCH) in varying time domains and/or frequency domains. For example, a configuration to divide a predetermined time unit (a subframe, a slot or a minislot) into different resource blocks (PRB) and allocate these resource blocks is anticipated.

FIG. 3 shows a configuration (frequency hopping), in which 1 slot is divided into 2 parts (first-half slot and second-half slot) and allocated to different frequency domains. By applying frequency hopping to control allocation, the quality of communication can be improved by a frequency diversity effect.

Note that FIG. 3 shows a case of dividing 1 slot into 2 parts, but it is equally possible to divide 1 slot into three or more parts, and allocate the divided parts (or PUSCH fields) in different time and/or frequency directions. In addition, although FIG. 3 shows a case where DMRS is allocated in the top symbol in each divided part, the locations and the number of DMRSs are not limited to these.

Also, assuming that uplink data may be transmitted by configuring an uplink shared channel in different time and/or frequency domains, studies are underway on controlling mapping of uplink data based on a predetermined order of allocation (order of mapping). For example, considering the quality and delay performance when frequency hopping is applied, data (CBs) may be mapped in the orders shown in FIG. 3 and FIG. 4.

FIG. 3 shows a configuration in which, in PUSCH fields of different times and/or frequencies (here, the first-half slot and the second-half slot), each CB is allocated in a same order (pattern) in the time direction (option A). Note that FIG. 3 shows a case where frequency-first mapping is applied to CBs mapped in each PUSCH field. To be more specific, in FIG. 3, in the first-half slot and the second-half slot, CB #1, CB #2 and CB #3 are allocated in order in the time direction.

FIG. 4 shows a configuration in which, in PUSCH fields of different times and/or frequencies (here, the first-half slot and the second-half slot), CBs are allocated in different orders in the time direction (option B). Note that FIG. 4 shows a case where frequency-first mapping is applied to CBs mapped in each PUSCH field. To be more specific, in FIG. 4, in the first-half slot, CB #1, CB #2 and CB #3 are allocated in order in the time direction and, in the second-half slot, CB #3, CB #2 and CB #1 are allocated in order in the time direction.

Note that the mapping patterns that can be applied to UL data are by no means limited to the configurations shown in option A and option B. For example, as shown in FIG. 3 and FIG. 4, it is also possible to employ a configuration for allocating a predetermined CB (for example, CB #0) only to a specific PUSCH field, instead of allocating CB #0 to be distributed over a number of PUSCH fields.

As described above, future radio communication systems may be configured so that uplink data is transmitted by configuring PUSCH in varying time domains and/or frequency domains (for example, by applying frequency hopping to PUSCH). In this case, if UCIs are multiplexed (or punctured) only in specific PUSCH fields, in a selective manner, the number of UCIs to be multiplexed (or the number of UCIs punctured) may vary between different PUSCH fields.

Future radio communication systems are planned to be designed to control retransmission in units of TBs or in units of one or more CBs (code block groups (CBGs)). Therefore, when UL data is transmitted from UE, a base station performs error detection on a per CB basis, and transmits ACKs/NACKs in response to all CBs (TBs) or in response to every CBG (multiple CBs). Therefore, when a particular CB shows a deterioration in error rate, CBs which the base station has managed to receive properly are also retransmitted, and there is a danger that increased overhead and/or delay may pose problems.

For example, assume a case in which, as shown in FIG. 5, when uplink data is transmitted by configuring PUSCH in varying time domains and/or frequency domains, UCI is transmitted using the PUSCH (UCI on PUSCH). In this case, when UCI is multiplexed in a specific PUSCH field in a localized manner, the number of UCIs multiplexed (the amount of puncturing) on CBs will increase in this specific PUSCH field. As a result of this, the amount of puncturing may vary among a plurality of CBs.

In this case, a specific CB's error rate will be deteriorated in the specific PUSCH field, and the possibility that this CB will fail to be received will be higher. If the base station fails to receive a specific CB alone, other CBs (CBs belonging to a same TB or CBG with the specific CB) also need to be retransmitted. From this, increased overhead and or delay may be produced, and the quality of communication might be degraded.

The present inventors have focused on the fact that the differences in error rates between CBs can be reduced, by making the number of UCIs multiplexed vary less among multiple PUSCH fields that differ in frequency and/or time, and come up with the idea of exerting control so that uplink control information is multiplexed in each of multiple PUSCH fields. By this means, it is possible to prevent the number of UCIs multiplexed (the number of resources to be punctured (for example, the number of symbols and/or the number of resource elements)) from increasing in a specific PUSCH field, in a localized manner, and prevent increased overhead and/or delay from being produced and damaging the quality of communication.

Also, assuming that UCI may be multiplexed in multiple PUSCH fields that differ in frequency and/or time, the present inventors have come up with the idea of controlling UCI-multiplexing positions (puncturing positions) in each PUSCH field based on predetermined allocation patterns. By this means, a configuration will be adopted in which predetermined allocation patterns are used regardless of how many CBs are used to transmit uplink data, so that the burden of transmission processes (for example, mapping process) in UE can be reduced.

Now, the present embodiment will be described below in detail. Note that, according to the present embodiment, UCI may include at least one of a scheduling request (SR), delivery acknowledgment information (also referred to as "HARQ-ACK (Hybrid Automatic Repeat reQuest-ACKnowledgement)," "ACK or NACK (Negative ACK)," "A/N," and so on) in response to a downlink data channel (for example, PDSCH (Physical Downlink Shared CHannel)), channel state information (CSI), beam index information (BI), and a buffer status report (BSR).

Note that, although the following description will show cases in which 3 CBs are mapped to a predetermined time unit, the number of CBs to map to a predetermined time unit may be 2 or less, or 4 or more. Also, embodiments of the present invention may be applied to predetermined block units apart from CB units.

Also, although the following description will show cases in which 1 slot is comprised of 14 symbols, the number of symbols that constitute 1 slot is not limited to 14, and 1 slot may be comprised of any other number of symbols (for example, 7 symbols). Also, although the following description will show cases of using intra-slot frequency hopping, the herein-contained embodiments can also be applied to inter-slot frequency hopping as well.

Also, although the following description will show cases in which at least the puncturing process will be introduced in the method of multiplexing UCI, the rate matching process may be applied instead of the puncturing process or together with the puncturing process. By applying common mapping control to the rate matching process and the puncturing process, the burden of transmission processes (for example, the mapping process) in UE can be reduced.

(UCI Multiplexing/Puncturing)

FIG. 6 and FIG. 7 show examples of cases in which uplink control information is multiplexed on each of the PUSCHs configured in multiple domains of different times and/or frequencies.

FIG. 6 and FIG. 7 show cases in which a PUSCH is divided into the first-half slot (the first field) and the second-half slot (the second field) and allocated to different frequencies (by applying frequency hopping). The number of PUSCH fields to use to transmit uplink data is not limited to 2, and may be 3 or more. Also, the number of symbols that constitute each PUSCH field may vary.

Also, FIG. 6 and FIG. 7 show cases where predetermined CBs are allocated in a distributed manner so that their code sequences are allocated across the first field and the second field where PUSCH is allocated, but this is by no means limiting. Also, although cases are illustrated in which a demodulation reference signal (DMRS) in allocated in every slot's top symbol, the number and/or the positions of DMRSs are by no means limited.

To be more specific, FIG. 6 shows an example of multiplexing UCI, in a configuration in which CBs are allocated in different PUSCH fields, in a same order in the time direction (option A). Also, FIG. 7 shows an example of multiplexing UCI, in a configuration in which CBs are allocated in different PUSCH fields, in different orders in the time direction (option B).

When UCI is multiplexed in a number of PUSCH fields (here, the first and second fields) and punctured, the multiplexing (or the puncturing positions) of UCI is controlled by applying predetermined allocation patterns to every PUSCH field.

For example, different allocation patterns may be applied to a number of PUSCH fields (for example, the first and second fields). Applying different allocation patterns means controlling UCI to be multiplexed (or punctured) in different positions in each PUSCH field.

For example, when varying allocation patterns are used, in a given PUSCH field (for example, the first field), UCI is multiplexed, first in the time direction, from the front in the time direction. Meanwhile, in another PUSCH field (for example, the second field), UCI is multiplexed, first in the time direction, from the end in the time direction (allocation configuration #1). Here, the front in the time direction refers to, for example, the top symbol in the PUSCH field, and the end in the time direction refers to, for example, the last symbol in the PUSCH field.

Alternatively, in a given PUSCH field (for example, the first field), UCI is multiplexed, first in the time direction, from the end in the time direction. On the other hand, in another PUSCH field (for example, the second field), UCI is multiplexed, first in the time direction, from the front in the time direction (allocation configuration #2). The UCI may be multiplexed either contiguously or non-contiguously along the time direction.

Alternatively, a same allocation pattern may be applied to multiple PUSCH fields (for example, the first and second fields). Applying a same allocation pattern means controlling UCI to be multiplexed (or punctured) in a same location in each PUSCH field.

For example, when the same allocation pattern is used, in a given PUSCH field (for example, the first field) and another PUSCH field (for example, the second field), UCI is multiplexed, first in the time direction, from the front in the time direction (allocation configuration #3). Alternatively, in a given PUSCH field (for example, the first field) and another PUSCH field (for example, the second field), UCI is multiplexed, first in the time direction, from the end in the time direction (allocation configuration #4). The UCI may be multiplexed either contiguously or non-contiguously along the time direction.

Note that, although allocation configurations #1 to #4 have illustrated cases in which UCI is multiplexed first in the time direction, from the top symbol or the last symbol in each PUSCH field, the method of multiplexing UCI is not limited to this. For example, in a PUSCH field, UCI may be allocated in the time direction from a symbol apart from the first or last symbol (a symbol in-between).

Also, a configuration may be used here, in which UCI is first multiplexed in the frequency direction. For example, when each CB is first mapped in the time direction, the number of times to puncture each CB can be distributed by mapping UCI first in the frequency direction.

FIG. 6 exemplifies the case of using allocation configuration #1. In this case, UCI is multiplexed first in the time direction, from the top symbol (the symbol to neighbor the DMRS) in the PUSCH field of the first-half slot. Furthermore, UCI is multiplexed first in the time direction, from the last symbol in the PUSCH field of the second-half slot. By this means, UCI can be distributed and multiplexed in each PUSCH field.

Also, in the configuration in which CBs are allocated in a same order in the time direction (option A), it is possible to effectively reduce the variation in the amount of puncturing, between CBs, by applying different allocation patterns to the first field and the second field (as in, for example, allocation configurations #1 and #2). Obviously, the number of resources to be punctured (for example, the number of symbols and/or the number of resource elements) varies depending on how many UCIs are multiplexed, so that other allocation configurations may be applied to option A.

FIG. 7 exemplifies the case of using allocation configuration #3. In this case, UCI is multiplexed first in the time direction, from the top symbol, in both the PUSCH field in the first half of a slot and the PUSCH field in the second half of the slot. By this means, UCI can be distributed and multiplexed in each PUSCH field.

Also, in the configuration in which CBs are allocated in different orders in the time direction (option B), it is possible to effectively reduce the variation in the amount of puncturing, between CBs, by applying a same allocation pattern to the first field and the second field (as in, for example, allocation configurations #3 and #4). Obviously, the number of resources to be punctured (for example, the number of symbols and/or the number of resource elements) varies depending on how many UCIs are multiplexed, so that other allocation configurations may be applied to option B.

In this way, when UCI is transmitted using PUSCH, UCI is controlled to be multiplexed in each of a number of PUSCH fields, so that the amount of puncturing can be distributed among the PUSCH fields (each CB). By this means, it is possible to prevent the number of UCIs multiplexed (or the amount of puncturing) from increasing in a specific PUSCH field, in a localized manner, and prevent increased overhead and/or delay from being produced and damaging the quality of communication.

Also, regardless of the number of CBs mapped in each PUSCH field and/or the locations CBs are allocated, predetermined allocation patterns (puncturing locations) may be applied to the UCI to be multiplexed on each PUSCH. This allows a common allocation pattern to be applied even when the number of CBs and/or the location to allocate CBs are likely to change every time UL data is transmitted (for example, per slot), so that the burden of transmission processing in UE can be reduced.

(Variations)

<Method for Multiplexing UCI>

FIG. 6 and FIG. 7 have shown cases in which UCI is multiplexed in a same frequency domain, along the time direction, but the method of multiplexing UCI is not limited to this. For example, the UCI to be multiplexed in individual PUSCH fields may be multiplexed on different frequency resources (see FIG. 8).

FIG. 8 shows a case where UCI is multiplexed, in each PUSCH field (here, the first and second fields), in a number of resources that are different in frequency and time. Note that, in FIG. 8, UCI is multiplexed non-contiguously in the frequency and time directions, but UCI may be multiplexed contiguously in at least one of the frequency and time directions.

Also, although FIG. 8 shows a case in which a same allocation pattern (variation of allocation configuration #3) is applied to the first field and the second field, it is equally possible to apply varying allocation patterns. Also, although FIG. 8 shows a case in which the configuration of option A is applied to uplink data (CB) mapping, the configuration of option B is equally applicable.

As shown in FIG. 8, a frequency diversity effect for UCI can be gained by inserting UCI in different frequency domains in each PUSCH field (for example, by inserting UCI so as to shift along the frequency direction).

In addition, in the event UCI is multiplexed (inserted) in a number of PUSCH fields, the order in which the UCI is inserted in each PUSCH field is not particularly limited. UCI may be inserted in each of a number of PUSCH fields (for example, the first and second fields) one by one (for example, the first field→the second field→the first field-→the second field, and on and on). Alternatively, a configuration may be employed here in which UCI is first inserted in a specific PUSCH field for a predetermined number of times and then inserted in the following CB (for example, the first field→the first field→the first field→the second field, and on and on).

Also, which UCI-allocating method (the UCI being, for example, information about allocation configurations) applies to each PUSCH field may be defined in the specification in advance, or may be reported from a base station to a user terminal via higher layer signaling and/or downlink control information.

<Uplink Data Mapping Configuration>

Furthermore, although FIG. 6 to FIG. 8 have shown cases in which the configurations of option A and option B are applied to the mapping of uplink data (each CB), the configurations to which the present embodiment can be applied are not limited to these. For example, as shown in FIG. 9, the methods for multiplexing UCI according to the present embodiment may be applied to configurations in which predetermined CBs (here, CBs #0 and #2) are not allocated across a number of PUSCH fields (here, the first and second fields).

In this way, even when predetermined CBs are multiplexed only in a specific PUSCH field, it is still possible to reduce the variation in the amount of puncturing between CBs by multiplexing UCI in every PUSCH field.

Note that the number of CBs to allocate to different PUSCH fields may be the same or different. Also, some CBs may be mapped so that their code sequences are distributed across multiple PUSCH fields, and the rest of the CBs may be mapped to only specific PUSCH fields.

Also, which uplink data mapping method (the uplink data being, for example, CBs) applies to each PUSCH field (that is, which one of option A, option B and/or others is used) may be defined in the specification in advance, or may be reported from a base station to a user terminal via higher layer signaling and/or downlink control information.

<The Number of CBs>

Although FIG. 6 to FIG. 9 have exemplified cases in which 3 CBs are transmitted, the number of CBs that can be used is not limited to 3. The number of CBs may be 1 or 2, or may be 4 or more. Note that, although the amount of puncturing does not vary between CBs when the number of CBs is 1, if UCI multiplexing is controlled as when the number of CBs is 2 or more, there is no need to change the method for multiplexing UCI depending on the number of CBs. In this case, the burden of transmission processes in UE can be reduced.

(PUSCH Field)

FIG. 6 to FIG. 9 show cases where 2 PUSCH fields are configured by dividing 1 slot into 2 slots—namely, the first-half slot and the second-half slot—by applying frequency hopping, the number of PUSCH fields that can be used is not limited to 2. For example, a PUSCH field may be divided into 3 or more parts and used. Also, multiple PUSCH fields may be comprised of different numbers of symbols.

Also, although FIG. 6 to FIG. 9 have shown cases in which frequency hopping is used (when allocating PUSCH fields in different frequency directions), the configurations of PUSCH fields that can be used are not limited to these. The herein-contained embodiments may be applied to configurations that do not use frequency hopping (for example, a configuration to provide multiple PUSCH fields in different time domains). Even when frequency hopping is not used, it is still possible to prevent the amount of puncturing from increasing in particular CBs by multiplexing UCI in every PUSCH field. Alternatively, different PUSCH fields may be provided only in frequency fields that are configured in a same time domain.

(Radio Communication System)

Now, the structure of a radio communication system according to the present embodiment will be described below. In this radio communication system, each radio communication method according to the above-described embodiments is employed. Note that the radio communication methods according to the herein-contained examples of the present invention may be applied individually, or may be combined and applied.

Figure 10:
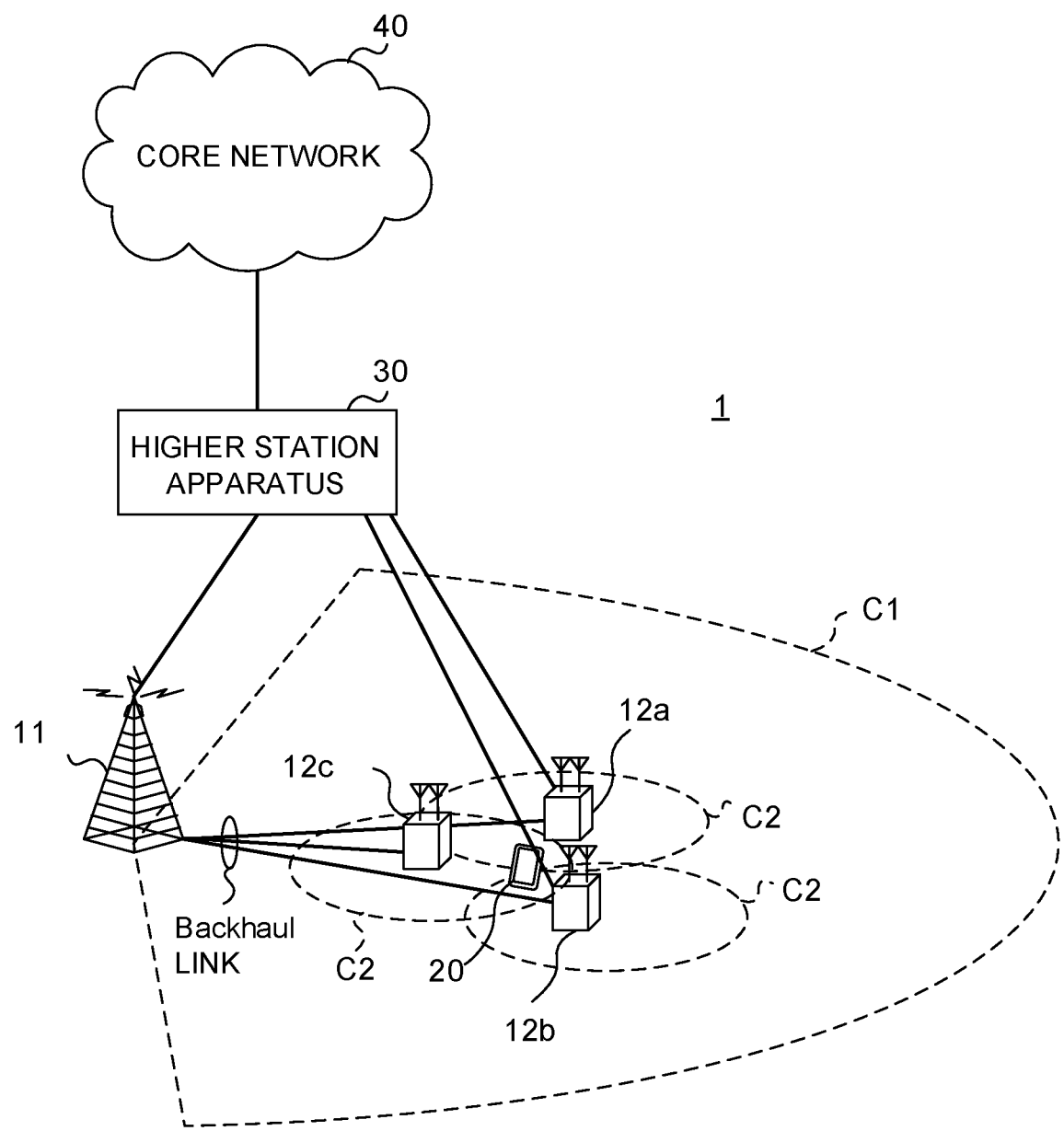
FIG. 10 is a diagram to show an exemplary schematic structure of a radio communication system according to the present embodiment.

FIG. 10 is a diagram to show an exemplary schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 10 includes a radio base station 11 that forms a macro cell C1, and radio base stations 12a to 12c that are allocated within the macro cell C1 and that form small cells C2, which are narrower than the macro cell C1. Also, user terminals 20 are allocated in the macro cell C1 and in each small cell C2. A configuration in which different numerologies are applied between cells may be adopted. Note that a "numerology" refers to a set of communication parameters that characterize the design of signals in a given RAT and/or the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), either subframes having a relatively long time duration (for example, 1 ms) (also referred to as "TTIs," "normal TTIs," "long TTIs," "normal subframes," "long subframes," "slots," and/or the like), or subframes having a relatively short time duration (also referred to as "short TTIs," "short subframes," and/or the like) may be applied, or both long subframes and short subframe may be used. Furthermore, in each cell, subframes of two or more time durations may be applied.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL. SC-FDMA can also be applied a side link (SL) that is used in inter-terminal communication.

DL channels that are used in radio communication system 1 include DL data channel that is shared by each user terminal 20 (also referred to as "PDSCH (Physical Downlink Shared CHannel)," "DL shared channel" and so forth), a broadcast channel (PBCH (Physical Broadcast CHannel)), L1/L2 control channels and so on. At least one of user data, higher layer control information and SIBs (System Information Blocks) is communicated in the PDSCH. Also, the MIB (Master Information Block) is communicated in the PBCH.

The L1/L2 control channels include DL control channels (PDCCH (Physical Downlink Control CHannel), EPDCCH (Enhanced Physical Downlink Control CHannel) and so on), PCFICH (Physical Control Format Indicator CHannel), PHICH (Physical Hybrid-ARQ Indicator CHannel) and so on. Downlink control information (DCI), including PDSCH and PUSCH scheduling information, is communicated by PDCCH and/or EPDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (A/N, HARQ-ACK, etc.) can be communicated in at least one of the PHICH, the PDCCH and the EPDCCH.

UL channels that are used in the radio communication system 1 include UL data channel that is shared by each user terminal 20 (also referred to as "PUSCH (Physical Uplink Shared CHannel)," "UL shared channel" and/or the like), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of PDSCH delivery acknowledgement information (A/N, HARQ-ACK, etc.), channel state information (CSI) and so on, is communicated in the PUSCH or the PUCCH. By means of the PRACH, random access preambles for establishing connections with cells are communicated.

(Radio Base Station)

Figure 11:
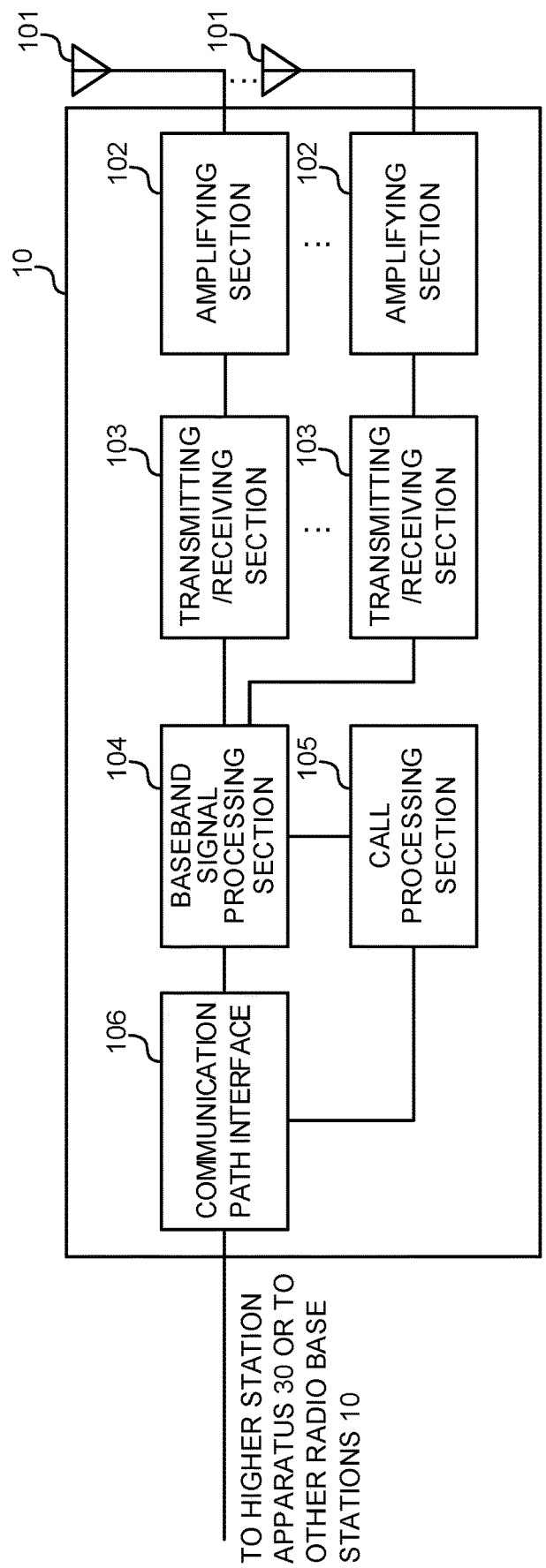
FIG. 11 is a diagram to show an exemplary overall structure of a radio base station according to the present embodiment.

FIG. 11 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including, for example, at least one of a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, rate matching, scrambling, an inverse fast Fourier transform (IFFT) process and a precoding process, and the result is forwarded to the transmitting/receiving sections 103. Furthermore, downlink control signals are also subjected to transmission processes such as channel coding and/or an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs, for example, at least one of call processing such as setting up and releasing of communication channels, management of the state of the radio base station 10 and management of radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

The transmitting/receiving sections 103 receive uplink data in units of predetermined blocks by using uplink shared channels configured in multiple domains that are different in frequency and/or time. Also, when uplink control information is transmitted from UE by using an uplink shared channel configured in multiple domains, the transmitting/receiving sections 103 receive the uplink control information that is multiplexed in each of the multiple domains. Also, the transmitting/receiving sections 103 may transmit information about the mapping configurations that UE applies to uplink data, and/or information about the allocation configurations that are applied to UCI multiplexing, by using higher layer signaling and/or downlink control information.

Figure 12:
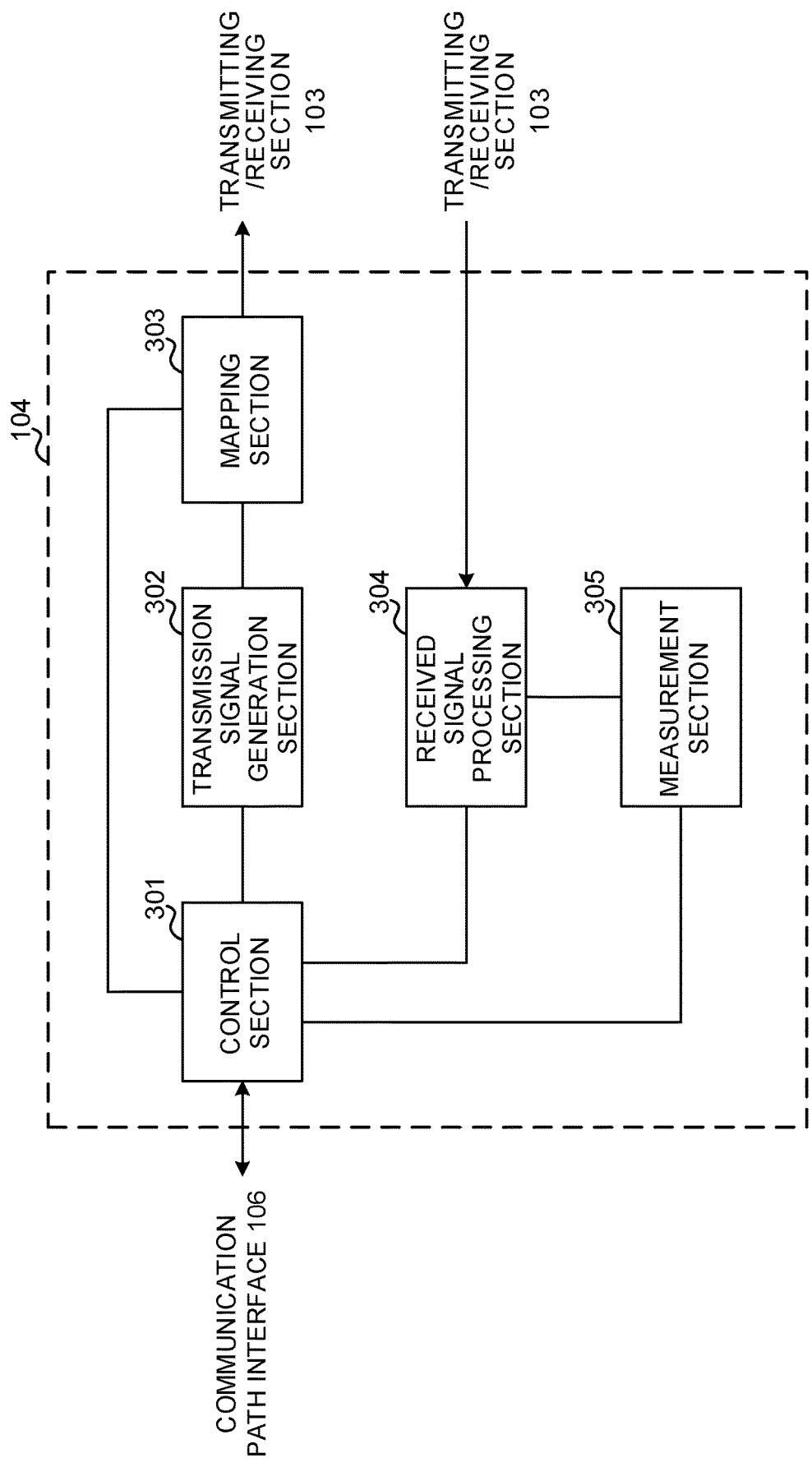
FIG. 12 is a diagram to show an exemplary functional structure of a radio base station according to the present embodiment.

FIG. 12 is a diagram to show an exemplary functional structure of a radio base station according to the present embodiment. Note that, although FIG. 12 primarily shows functional blocks that pertain to characteristic parts of the present embodiment, the radio base station 10 has other functional blocks that are necessary for radio communication as well. As shown in FIG. 12, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305.

To be more specific, the control section 301 schedules user terminals 20. For example, the control section 301 controls the transmission timing and/or the transmission period of an uplink shared channel, and the transmission timing and/or the transmission period of uplink control information. In addition, the control section 301 controls receipt of the uplink shared channel on which uplink data and uplink control information are multiplexed.

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on commands from the control section 301, and outputs these signals to the mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, a mapper, a mapping circuit or mapping apparatus that can be described based on general understanding of the technical field to which the present invention pertains can be used.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may output the received signals and/or the signals after receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 13:
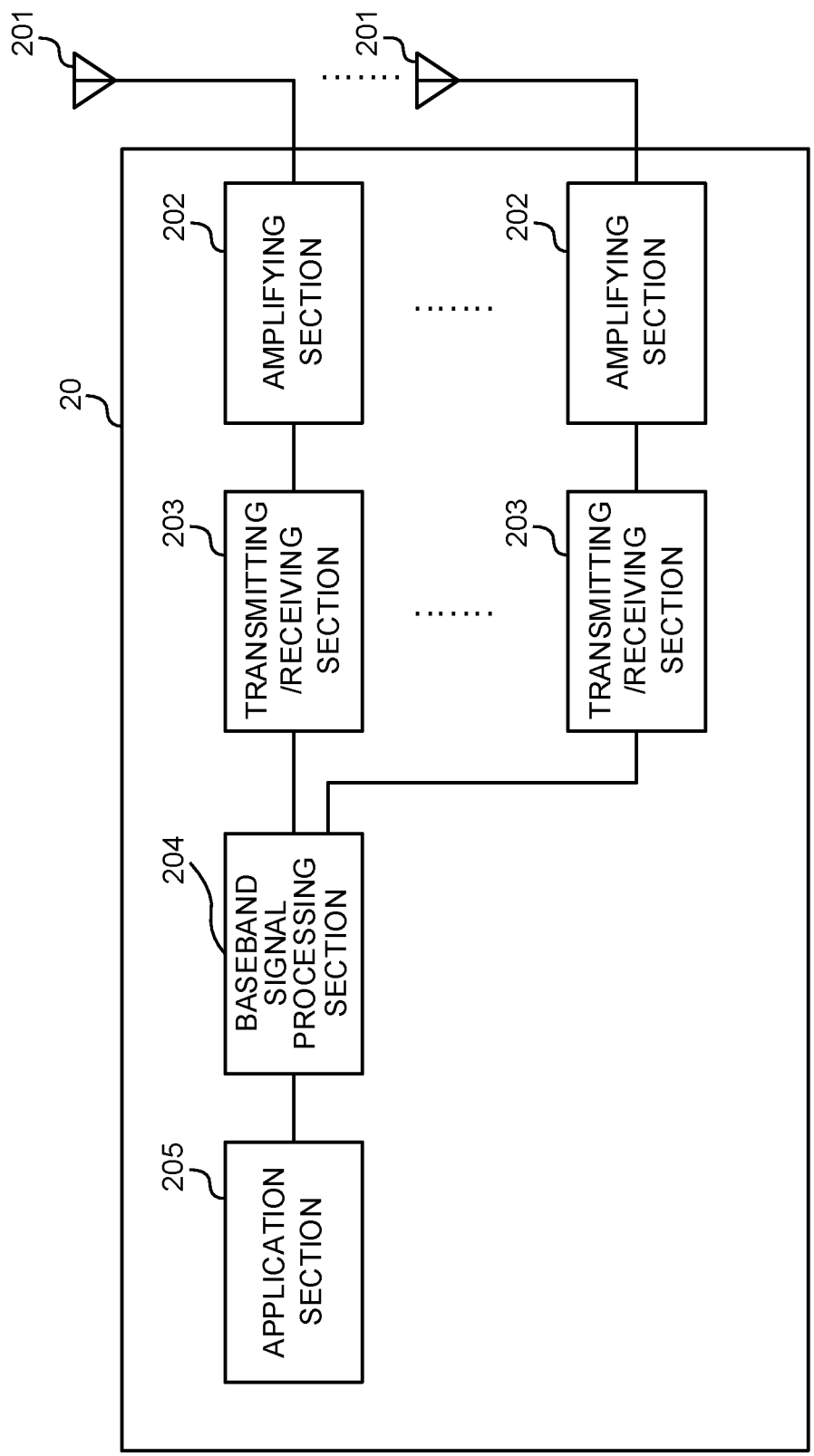
FIG. 13 is a diagram to show an exemplary overall structure of a user terminal according to the present embodiment.

FIG. 13 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204.

The baseband signal processing section 204 performs receiving processes for the baseband signal that is input, including at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs at least one of a retransmission control process (for example, an HARQ process), channel coding, rate matching, puncturing, a discrete Fourier transform (DFT) process, an IFFT process and so on, and the result is forwarded to each transmitting/receiving section 203. UCI (including, for example, at least one of an A/N in response to a DL signal, channel state information (CSI) and a scheduling request (SR), and/or others) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit uplink data in units of predetermined blocks by using uplink shared channels configured in multiple domains that are different in frequency and/or time. Also, when transmitting uplink control information by using an uplink shared channel that is configured in multiple domains, the transmitting/receiving sections 203 multiplex and transmit uplink control information in a number of domains. Also, the transmitting/receiving sections 203 may receive information about the mapping configurations that UE applies to uplink data, and/or information about the allocation configurations that are applied to UCI multiplexing, by using higher layer signaling and/or downlink control information.

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as 1 transmitting/receiving section, or may be formed with a transmitting section and a receiving section.

Figure 14:
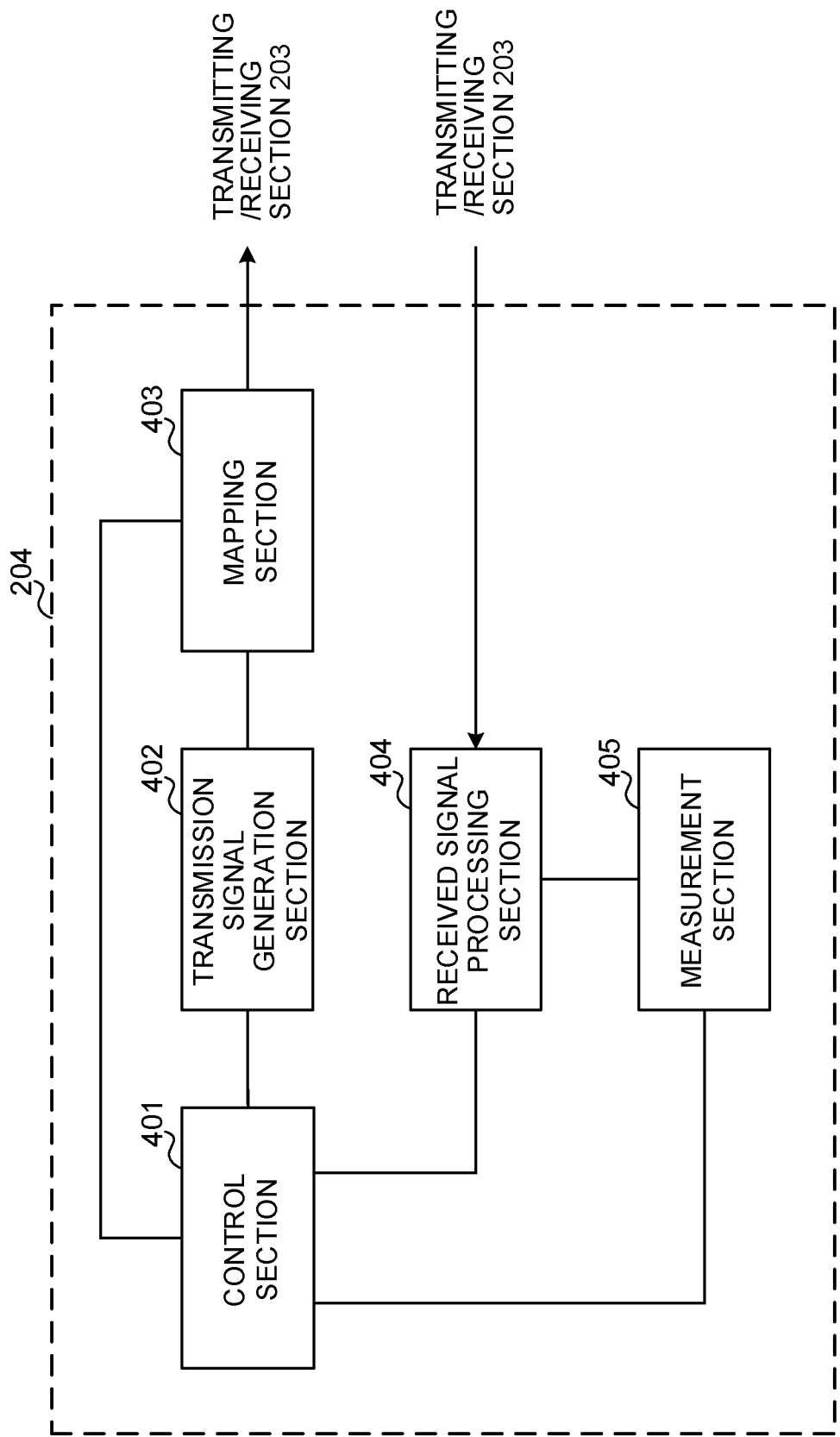
FIG. 14 is a diagram to show an exemplary functional structure of a user terminal according to the present embodiment.

FIG. 14 is a diagram to show an exemplary functional structure of a user terminal according to the present embodiment. Note that, although FIG. 14 primarily shows functional blocks that pertain to characteristic parts of the present embodiment, the user terminal 20 has other functional blocks that are necessary for radio communication as well. As shown in FIG. 14, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

The control section 401 also controls the transmission of uplink data (for example, CBs) and uplink control information (UCI) using an uplink shared channel (PUSCH). For example, when uplink control information is transmitted using an uplink shared channel, the control section 401 controls so that uplink control information is multiplexed in each of a number of PUSCH fields.

Also, the control section 401 may control the multiplexing of uplink control information in multiple PUSCH fields based on a same allocation pattern. Also, the control section 401 may control the multiplexing of uplink control information in multiple PUSCH fields based on different allocation patterns.

Also, the control section 401 may control the multiplexing of uplink control information based on a common allocation pattern regardless of how many predetermined blocks of uplink data are allocated to multiple PUSCH fields. Also, the control section 401 may allocate uplink data that corresponds to a same predetermined block, in each of a number of domains.

The control section 401 can be constituted by a controller, a control circuit or control apparatus that can be described based on general understanding of the technical field to which the present invention pertains.

In the transmission signal generation section 402, UL signals (including UL data signals, UL control signals, UL reference signals, UCI, etc.) are generated (including, for example, encoding, rate matching, puncturing, modulation, etc.) based on commands from the control section 401, and output to the mapping section 403. For the transmission signal generation section 402, a signal generator, a signal generation circuit or signal generation apparatus that can be described based on general understanding of the technical field to which the present invention pertains can be used.

The mapping section 403 maps the uplink signals (uplink data, uplink control information, etc.) generated in the transmission signal generation section 402, to radio resources, based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 15:
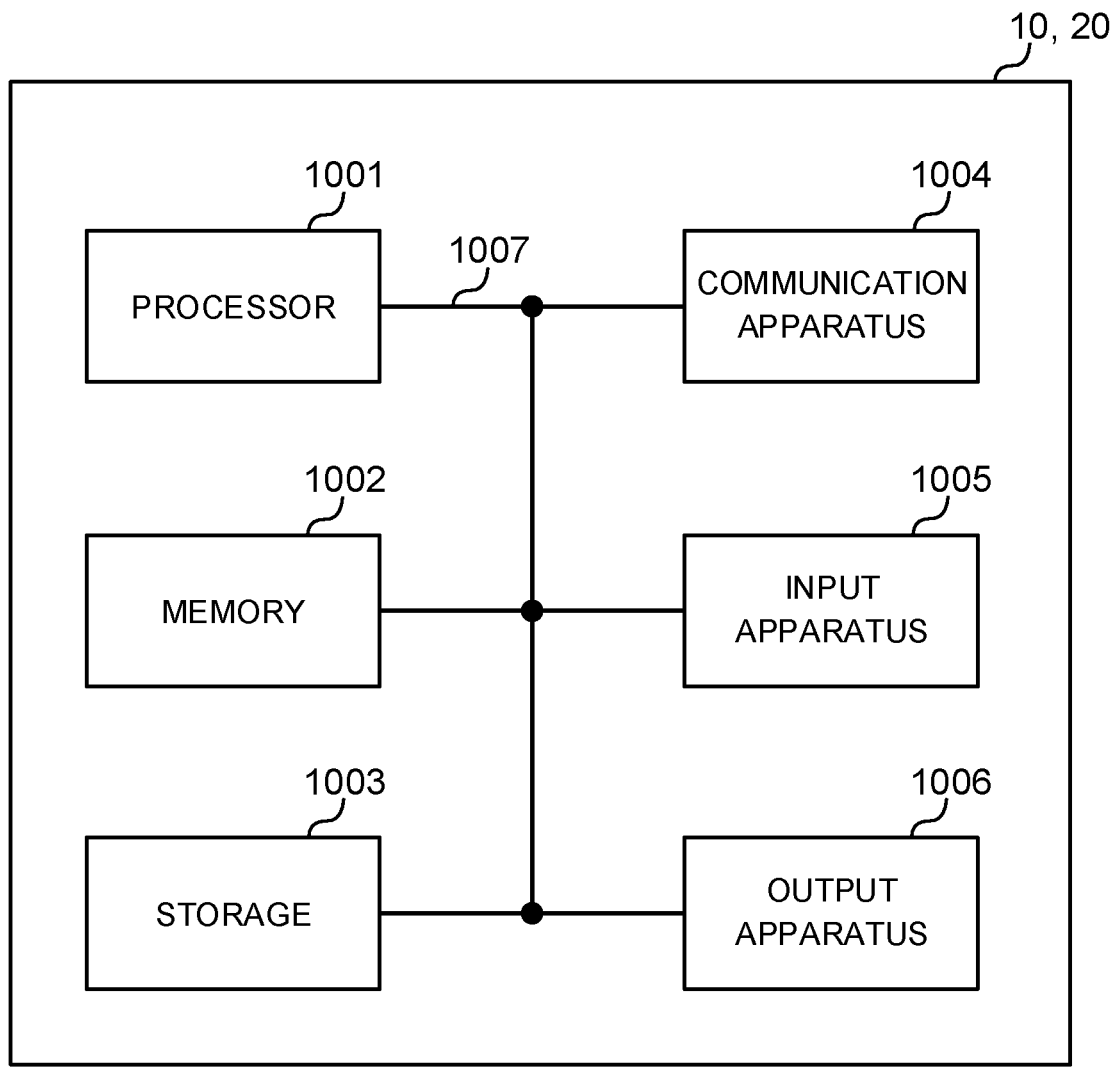
FIG. 15 is a diagram to show an exemplary hardware structure of a radio base station and a user terminal according to the present embodiment.

That is, a radio base station, a user terminal and so on according to an embodiment of the present invention may function as a computer that executes the processes of the radio communication method of the present invention. FIG. 15 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be reallocated by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and the like for implementing the radio communication methods according to the present embodiment.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be reallocated by other terms that convey the same or similar meanings. For example, "channels" and/or "symbols" may be reallocated by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or minislot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," a "minislot," "a sub-slot" and so on.

Note that a long TTI (for example, a normal TTI, a subframe, etc.) may be reallocated with a TTI having a time duration exceeding 1 ms, and a short TTI (for example, a shortened TTI) may be reallocated with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is reallocated with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a transmitter that transmits delivery acknowledgement information for a downlink shared channel and uplink data using a physical uplink shared channel (PUSCH); and
   a processor that, if frequency hopping is applied to the PUSCH, determines a mapping position for the delivery acknowledgement information for each hop of the frequency hopping,
   wherein the processor first maps the delivery acknowledgement information in a frequency direction on the PUSCH for each hop of the frequency hopping.

2. The terminal according to claim 1, wherein the processor maps the delivery acknowledgement information to consecutive or non-consecutive resource elements in the frequency direction for each hop of the frequency hopping.

3. The terminal according to claim 2, wherein the transmitter is further configured to transmit channel state information using the PUSCH.

4. The terminal according to claim 1, wherein the transmitter is further configured to transmit channel state information using the PUSCH.

5. A radio communication method for a terminal, comprising:
   transmitting delivery acknowledgement information for a downlink shared channel and uplink data using a physical uplink shared channel (PUSCH); and
   if frequency hopping is applied to the PUSCH, determining a mapping position for the delivery acknowledgement information for each hop of the frequency hopping,
   wherein the delivery acknowledgement information is first mapped in a frequency direction on the PUSCH for each hop of the frequency hopping.

6. A system comprising a terminal and a base station, wherein:
   the terminal comprises:
      a transmitter that transmits delivery acknowledgement information for a downlink shared channel and uplink data using a physical uplink shared channel (PUSCH); and
      a processor that, if frequency hopping is applied to the PUSCH, determines a mapping position for the delivery acknowledgement information for each hop of the frequency hopping,
      wherein the processor first maps the delivery acknowledgment information in a frequency direction on the PUSCH for each hop of the frequency hopping; and
   the base station comprises:
      a receiver that receives the delivery acknowledgement information and uplink data transmitted using the PUSCH.

* * * * *